W. P. FAULKNER.
ATTACHMENT FOR LAWN MOWERS.
APPLICATION FILED AUG. 9, 1915.
1,163,745.
Patented Dec. 14, 1915.
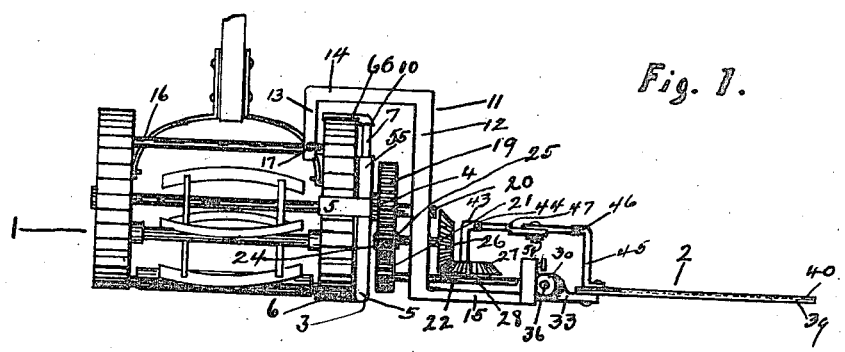
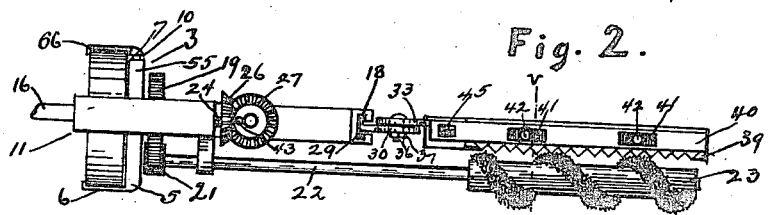
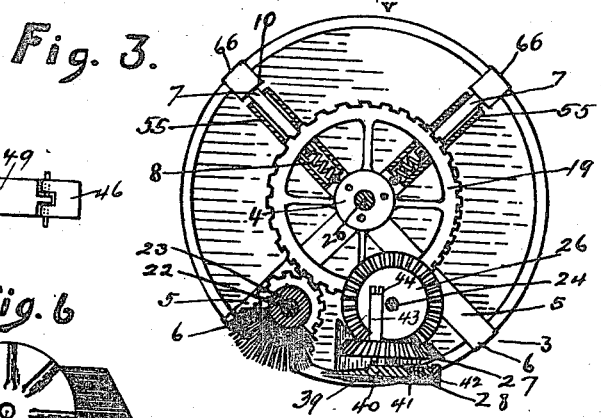
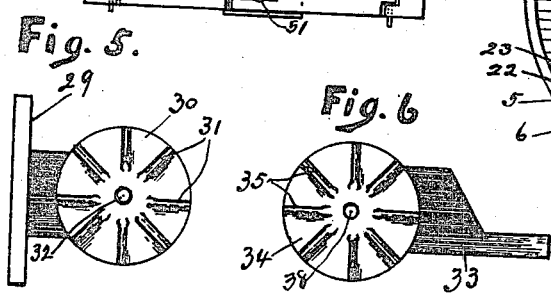
WITNESSES:
INVENTOR
WILLIAM P. FAULKNER
BY
M. C. Gillham
ATTORNEY

UNITED STATES PATENT OFFICE.

WILLIAM P. FAULKNER, OF KANSAS CITY, MISSOURI.

ATTACHMENT FOR LAWN-MOWERS.

1,163,745. Specification of Letters Patent. Patented Dec. 14, 1915.

Application filed August 9, 1915. Serial No. 44,579.

*To all whom it may concern:*

Be it known that I, WILLIAM P. FAULKNER, a citizen of the United States, and a resident of Kansas City, in the county of Jackson and State of Missouri, have invented a new and useful Improvement in Attachments for Lawn-Mowers, of which the following is a specification.

My invention relates to attachments for lawn mowers, and the objects of my invention are—first, to provide a cheap, efficient and durable clipping attachment adapted for mounting on the driving traction wheel of the lawn mower and clip the grasses outwardly of the mower at the edges of walks, foundations and remote places not possible to be clipped by the mower blades, second, to provide a frame adapted to support and carry the mechanism of the attachment, adapted to be mounted on the mower, third, to provide a fastener with adjustable spring actuated arms co-acting with rigid arms adapted to hold the attachment in place on the mower, and carrying a gear wheel adapted to drive the mechanism of the attachment, fourth, to provide blades with teeth adapted to move responsive to the pressure of the driving gear wheel, and means for adjusting the blades to operate at different angles, and fifth, to provide a roller brush operable by the driving gear wheel and adapted to operate parallel with and in advance of the blades to place the grasses in position to be clipped by the blades.

I attain these and other objects by the mechanism illustrated in the accompanying drawing, in which—

Figure 1, is a front elevation of my invention attached to a drive wheel of the mower, the roller brush being not shown, Fig. 2, is a plan view of my invention and showing the roller brush operatively positioned parallel with the blades, and showing the adjusting means for operating the blades at an angle, the means for driving the blades being omitted, Fig. 3, is a view, partly sectioned, on the line V—V, in Fig. 2 looking toward the lawn mower wheel. Fig. 4, is a plan view from the top side of the hingedly mounted adjustable connection between the driving wheels and the blades, Fig. 5, is a plan view from the inner side of the slide-member, Fig. 6, is a plan view from the inner side of the supporting member which carries the blades.

Similar numerals refer to corresponding parts through the several views.

The numeral 1, indicates a lawn mower of the usual type. 2, is my invention applied to one of the driving wheels of the mower. A fastener 3, comprising a hub 4, which registers with the center of said drive wheel of the mower, and non-extensible arms 5, which are extended from the hub on radial lines radiating from the center of the hub 4, and having their respective end portions bent outwardly and downwardly to form hands 6, adapted for grasping the peripheral face of the drive wheel of the mower, and extensible arms 55, which are formed in sections, the lower section of each of these arms are provided with a longitudinal bore, preferably bored square, and the bore adapted to receive the outer portion 7, which is adapted to move freely within the bore in the lower portion of said extensible arms, the outer end portions of the portions 7, are bent to form hands 66, adapted to engage the peripheral edge of the mower wheel. This provision is for the purpose of the quick assembly and adjustment of the device with the mower, independently of bolts and screws or other fasteners. A coiled spring 8, is mounted in the bore of the sectional arms 55, and its lower end is secured on the immovable portion of the arm and its upper end is secured on the inner end of the movable portion of the arm, so that the tension of spring 8, will normally hold the movable section within the bore in the immovable portion. This provision allows the movable portion of the arm to be extended against the tension of the spring 8, so that the hand 66, thereon shall grasp the periphery of the mower drive wheel and thereby securely hold the fastener 3, on the mower wheel and compel it to revolve with said wheel. A shoulder 10, is formed on the outer portion 7, of the sectional arms for the purpose of limiting the inward movement of the said movable portion and to hold the spring tensioned. A supporting frame 11, having vertical portions 12, and 13, and horizontal portions 14 and 15, is secured in position on the tie-rod 16, by the set screw 17. The portion 15, is adapted for the support of the mechanism, hereafter fully described. A heel is formed on the outer end of the portion 15, of the frame 11, and is provided with a slide 18, having a slotted opening in its outer face. A gear wheel 19, is rigidly secured on the outer face of the hub 4, and is provided with a shaft 20, which is journaled adjacent its outer end in the portion 12, of the frame 11, and is adapted to revolve therein. A gear wheel 21, provided with a shaft 22, journaled in the portion 12, of the frame 11, is adapted to be engaged and propelled by the gear wheel 19. The said shaft 22, is extended outwardly of the frame a suitable distance and a roller brush 23, is mounted on its outer end and adapted to turn therewith. A shaft 24, is journaled in the portion 12, of the frame 11, and a pinion 25, is mounted on its inner end and adapted to be engaged by the gear wheel 19, and a beveled gear wheel 26, is mounted on its outer end. A beveled gear wheel 27, provided with a shaft 28, movably mounted in the portion 15, of the frame 11, is engaged by the gear wheel 26. A slide-member 29, is movably mounted in the slide 18, the outer end of said member is made to form a circular portion 30, and the inner face of said member is provided with a plurality of corrugations 31, which are extended upon radial lines from the axial center of the said circular portion 30. A hole 32, is apertured centrally in said circular portion 30. A set screw is extended through the outer side of the slide 18, and adapted to bear upon the slide-member 29, to hold the latter in place, as shown in Fig. 1. An adjustable supporting-member 33, provided at its inner end with a circular portion 34, having a plurality of corrugations 35, on its inner face similar to the corrugations 31, on the slide-member 29 is assembled with the portion 30, of the slide-member and having its corrugations positioned between the corrugations on the slide-member, thereby providing means for sustaining the supporting-member at an angle. A bolt 36, having a clamping nut 37, is extended through the hole 32, in the slide member and through the hole 38 in the supporting member, and thereby the said members are clamped together. A serrated blade 39, is mounted on the outer end of the supporting member 33, and a similar blade 40, is mounted movably on the upper side of blade 39. The blade 40, is provided with elongated slots 41, which are pierced vertically by a pin 42, mounted on the upper side of the blade 39. The said slots and pins co-act to limit the movement of the blade 40. A post 43, provided at its upper end with a hinge portion 44, is movably mounted on the gear wheel 27, the lower end portion of said post is reduced in diameter and the reduced portion is extended through the gear wheel, so as to shoulder on the upper face thereof. The post 43, is movable in the said gear wheel, and is located therein closely adjacent the shaft 28, at a point suitable for moving the blade 40, to and fro endwise the proper distance to traverse the distance across the teeth of the blade 39, to clip the grasses brought between said teeth. A standard 45, having a hinge portion 46, at its upper end is mounted on the inner end portion of the blade 40. A hinge portion 47, having its inner end expanded transversely, and the expanded portion recessed a suitable distance inwardly from its outer end to form a slide-bearing 48, is hingedly connected with the post 43, and a hinge portion 49, provided with a slotted aperture 50, at its inner end portion and overlapping the upper face of the recessed portion 48, and pierced by a pin 51, which is secured on the hinge portion 47, is hingedly connected with the standard 46. This provision is for the purpose of providing a flexible and adjustable power transmitting means between the gear wheel 27, and the blade 40, so that when the adjustable member 33, is set at any angle, the hinge portions 47 and 49, may be adjusted to or from each other as the circumstances may require.

To operate my invention constructed as above described, the fastener 3, is mounted on the mower drive wheel by placing the hands of the immovable rigid arms 5, on the lower peripheral face of said wheel. The outer portions 7, of the extensible arms 55, are extended against the tension of the spring 8, and the hands 66, on said extensible arms are placed upon the peripheral edge of the mower wheel in opposition to the hands on the immovable arms at the opposite side of the mower wheel. The frame 11, is then secured by its upper end to the tie rod 16. In the assembly of the parts, the stud shaft 20, on the gear wheel 19, is journaled in the frame 11, and the pinion 25, and the gear wheel 21, are thereby brought in engagement with the drive wheel 19. The blades 39 and 40, are then adjusted to the desired angle, and for this purpose the bolt 36, is extended through the holes in the members 29 and 33, when they have been positioned with respect to the angular adjustment of the blades 39 and 40. The corrugations on the inner faces of the members 29 and 33, contact each other and thereby hold the blades at the angle to which they are adjusted, this contact being made dependable by the pressure of the clamping screw 36, when the same is properly tightened. When the blades are provided with the desired adjustment, the hinge portion 49, is advanced or withdrawn in the slide bearing 48, the hinge portion 47, co-acting with the hinge portion 49, to give the blade 40, its proper stroke or thrust. The mower is then pushed forwardly in the well known manner of operating manually operated lawn mowers. In this movement the mower wheel revolves the fastener 3, and the drive gear wheel 19, mounted thereon, and the latter in turn revolves the pinion 25, and the gear wheel 26, at the outer end of the shaft 24, and the gear wheel 26 revolves the gear wheel 27, thereby imparting a to and fro endwise movement of the blade 40, by means of the hingedly mounted connection between said last mentioned gear wheel and the blade 40. The drive gear wheel 19, also revolves the gear wheel 21 and thereby the roller brush 23, is revolved and raises the recumbent grasses for the clipping process. The blades may be adjusted to cut the grass close to the earth or spaced therefrom by moving the slide-member higher or lower in the slide 18.

The peculiar advantage of the construction above described is that the clipper may be adjusted to clip at any angle, thereby making it unnecessary to cut the grasses at the sides of terraces, walks, gardens and buildings, and other remote places where the lawn mower of the usual type cannot operate, by hand implements such as shears, sickles and the like. The simple and speedy facility for attaching the device to lawn mowers without tools or other fastening devices, so that the mowing of the lawn may include the clipping of borders and margins of every description, at the same time and with the usual effort, is a decided improvement over the ordinary methods employed to cut lawn grasses.

Although I show the invention attached to a mower, it is understood that the device may be attached to any wheel adapted for the purpose without departing from my invention or the scope of the appended claims. The working of the device by an independent wheel is clearly shown in Fig. 1 by suggestion.

Having described my invention, what I claim, is:

1. In an attachment for lawn mowers, the combination with a mower wheel, of a hub adapted to register with the axial center of the wheel and provided with a plurality of radially extending extensible arms having hands adapted to bear on the peripheral face of the wheel and revolve said hub with the wheel, a prime-mover mounted on said hub, a frame suspended by the mower, a slide-member slidably mounted on said frame and provided with a plurality of radially-extending corrugations on its inner face, a supporting-member provided with a plurality of radially-extending corrugations on its inner face and adapted to interlock with the corrugations on said slide-member, a serrated blade mounted on said supporting-member, a serrated blade slidably mounted on said above-mentioned blade, and power receiving and power imparting means operable by said prime mover and adapted to move said last-mentioned blade.

2. In an attachment for lawn mowers, the combination with a mower wheel, of a hub adapted to register with the axial center of the wheel and provided with a plurality of radially extending extensible arms having hands adapted to bear on the peripheral face of the wheel and revolve said hub therewith, a prime mover mounted on said hub, a frame suspended by the mower, a serrated blade adjustably connected with said frame, a serrated blade slidably mounted on said above-named blade, and power receiving and power imparting means operable by said prime-mover and adapted to move said last-mentioned blade.

3. In an attachment for lawn mowers, the combination with a mower wheel, of a hub adapted to register with the axial center of the wheel and provided with a plurality of radially extending extensible arms having hands adapted to bear on the peripheral face of the wheel and revolve said hub therewith, a prime-mover mounted on said hub, a frame suspended by the mower, a serrated blade adjustably connected with said frame, a serrated blade slidably mounted on said above-named blade, a roller brush revolubly mounted on said frame and disposed parallel with the forward edge of said blades, and power receiving and power imparting means operable by said prime-mover and adapted to simultaneously move said blades and said roller brush.

4. In an attachment for lawn mowers, the combination with a mower wheel, of a hub adapted to register with the axial center of the wheel and provided with a plurality of radially extending extensible arms having hands adapted to bear on the peripheral face of the wheel and revolve said hub therewith, a prime mover mounted on said hub, a frame suspended by the mower, a serrated blade adjustably connected with said frame, a serrated blade slidably mounted on said above-named blade, power receiving and power imparting means operable by said prime-mover to move said last-mentioned blade, and an adjustable hingedly mounted connection between said power receiving and power imparting means and said last-mentioned blade.

5. In an attachment for lawn mowers, the combination with a mower wheel, of a hub adapted to register with the axial center of the mower wheel and provided with a plurality of radially extending extensible arms having hands adapted to bear on the peripheral face of the wheel and thereby revolve said hub, a prime-mover mounted on said hub, a frame suspended by the mower, and a roller brush revolubly mounted on said frame and operable by said prime mover.

6. In an attachment for lawn mowers, the combination, of a frame suspended by the mower, a slide-member movably mounted on said frame and provided with a plurality of radially extending corrugations on its inner face, a supporting member provided with a plurality of radially extending corrugations on its inner face and adjustably assembled with said slide-member, a serrated blade mounted on said supporting-member, a serrated blade slidably mounted on said above-mentioned blade, a prime mover mounted on the mower wheel, and power receiving and power imparting means operable by said prime mover and adapted to move said last-mentioned blade.

7. In an attachment for lawn mowers, the combination, of a frame, a beveled gear wheel rotatably mounted on said frame, a crank eccentrically mounted on said gear wheel and provided with a hinge portion at its upper end, a serrated reciprocably mounted blade, a standard carried by said blade and having a hinge portion at its upper end, a link hingedly connected with said crank, a link hingedly connected with said standard and overlapping the inner end of the link on said crank, and power receiving and power imparting means adapted to turn said crank.

8. In an attachment for lawn mowers, the combination with a mower wheel, of a hub provided with radially-extending extensible arms having hands adapted to bear on the peripheral face of the wheel and with radially-extending non-extensible arms, the end portions of said last mentioned arms being bent outwardly and adapted to engage the peripheral face of the wheel, a prime mover mounted on said hub, a frame suspended by the mower, a slide-member slidably mounted on said frame and provided with radially-extending corrugations, a supporting-member provided with radially-extending corrugations interlocked with the corrugations on said slide-member, a serrated blade mounted on said supporting-member, a serrated blade slidably mounted on said above mentioned blade, power receiving and power imparting means mounted on said frame and operable by said prime mover, a hingedly mounted adjustable connection between said power receiving and power imparting means and said last mentioned blade, and a roller brush operable by said prime mover and adapted to operate in advance of said blades.

9. A clipping attachment for lawn mowers, comprising a hub adapted to register with the axial center of the wheel of the mower and provided with a plurality of radially extending extensible arms having hands adapted to bear on the peripheral face of the said wheel, a prime-mover mounted on said hub, a frame suspended by the mower, a shaft provided with a pinion engaged by said prime-mover and with a beveled gear wheel and movably journaled in said frame, a shaft journaled in said frame and provided with a gear wheel engaged by said prime-mover and with a roller brush, a beveled gear wheel having a crank mounted on said frame and engaged by said first named beveled gear wheel, a serrated blade adjustably connected with said frame, a serrated blade slidably mounted on said first named blade, an adjustable hingedly mounted connection between said last named blade and said crank, and means for imparting motion to said prime mover.

10. In an attachment for lawn mowers, the combination with a mower wheel, of a hub provided with radially-extending extensible arms having hands adapted to bear on the peripheral face of the wheel and with radially-extending non-extensible arms, the end portions of said last mentioned arms being bent outwardly and adapted to engage the peripheral face of the wheel, a prime mover mounted on said hub, a frame suspended by the mower, a slide-member slidably mounted on said frame and provided with radially-extending corrugations, a supporting-member provided with radially-extending corrugations interlocked with the corrugations on said slide-member, a serrated blade mounted on said supporting-member, a serrated blade slidably mounted on said above-mentioned blade, power receiving and power imparting means mounted on said frame and operable by said prime mover, and a hingedly mounted adjustable connection between said power receiving and power imparting means and said last mentioned blade.

WILLIAM P. FAULKNER.

Witnesses:
J. MORGAN MARMADUKE,
OMAR C. NEILLMAN.